US005082232A

United States Patent [19]

Wilson

[11] Patent Number: 5,082,232

[45] Date of Patent: Jan. 21, 1992

[54] CABLE LOCK

[75] Inventor: Edwin P. Wilson, Allison Park, Pa.

[73] Assignee: Minatronics Corporation, Pittsburgh, Pa.

[21] Appl. No.: 489,049

[22] Filed: Mar. 6, 1990

[51] Int. Cl.[5] .......... F16M 13/00

[52] U.S. Cl. .......... 248/551; 24/115 G

[58] Field of Search .......... 248/51, 551-553; 24/115 G, 136 R

[56] References Cited

U.S. PATENT DOCUMENTS

| | | | |
|---|---|---|---|
| 1,204,457 | 11/1916 | Kreeft | 24/115 G X |
| 2,457,195 | 12/1948 | Bagnall, Jr. | 24/115 G |
| 4,328,605 | 5/1982 | Hutchison et al. | 24/136 R X |
| 4,811,466 | 3/1989 | Zubli | 24/115 G |
| 4,817,250 | 4/1989 | Kurosaki | 24/115 G |

*Primary Examiner*—Gary L. Smith

*Assistant Examiner*—Suzanne L. Dino

*Attorney, Agent, or Firm*—Ansel M. Schwartz

[57] ABSTRACT

An apparatus for linking a cable to an object comprising a first element having a first channel passing therethrough which receives a connector that fixedly links the first element to the object. The first element also has a second channel passing therethrough which intersects the first channel and through which the cable extends. In addition, the apparatus is comprised of a blocker disposed in the first channel for preventing the connector from being removed. In a preferred embodiment, the apparatus includes a second element having a chamber, and a third channel passing therethrough and intersecting the chamber such that the chamber can receive the first element, and the second channel and third channel align so the cable can extend through the first element and the second element by way of the second channel and third channel.

1 Claim, 1 Drawing Sheet

CABLE LOCK

FIELD OF THE INVENTION

The present invention relates to locks. More specifically, the present invention relates to an apparatus that links a cable to an object.

BACKGROUND OF THE INVENTION

With the advent of the use of computers a proliferation of expensive but portable equipment has appeared in such places as offices, schools or laboratories. Traditional locks are used to prevent the theft of such equipment. However, because of the multitude of these products, it is impractical to always have someone present to prevent a robber from breaking the lock and removing the equipment. The present invention is an apparatus which allows a monitoring system to be easily integrated with equipment or objects that are desired to be protected.

SUMMARY OF THE INVENTION

The present invention pertains to an apparatus for linking a cable to an object. The apparatus comprises a first element having a first channel passing therethrough which receives a connector that fixedly links the first element to the object. The first element also has a second channel passing therethrough which intersects the first channel and through which the cable extends. In addition, the apparatus is comprised of a blocker disposed in the first channel for preventing the correctors from being removed. In a preferred embodiment, the apparatus includes a second element having a chamber, and a third channel passing therethrough and intersecting the chamber such that the chamber can receive the first element, and the second channel and third channel align so the cable can extend through the first element and the second element by way of the second channel and third channel.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
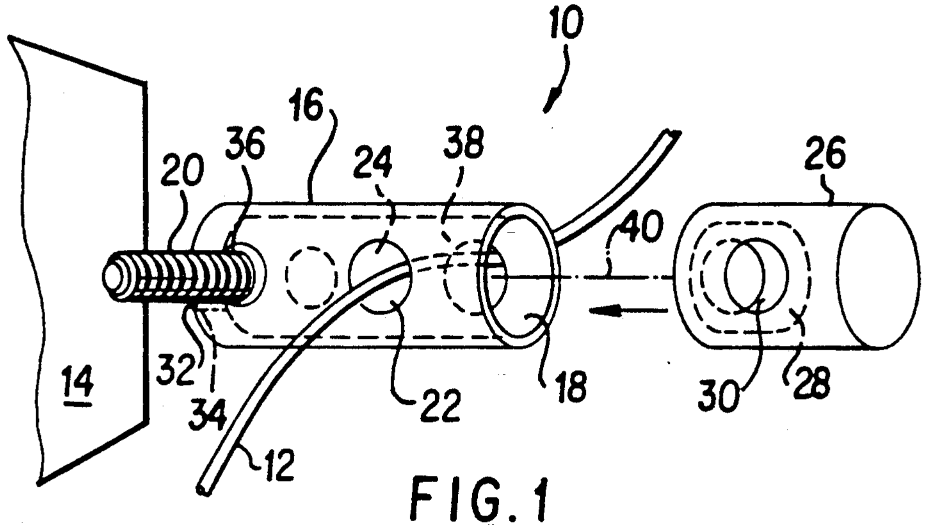
FIG. 1 is a schematic representation of an apparatus for linking a cable to an object.
Figure 2:
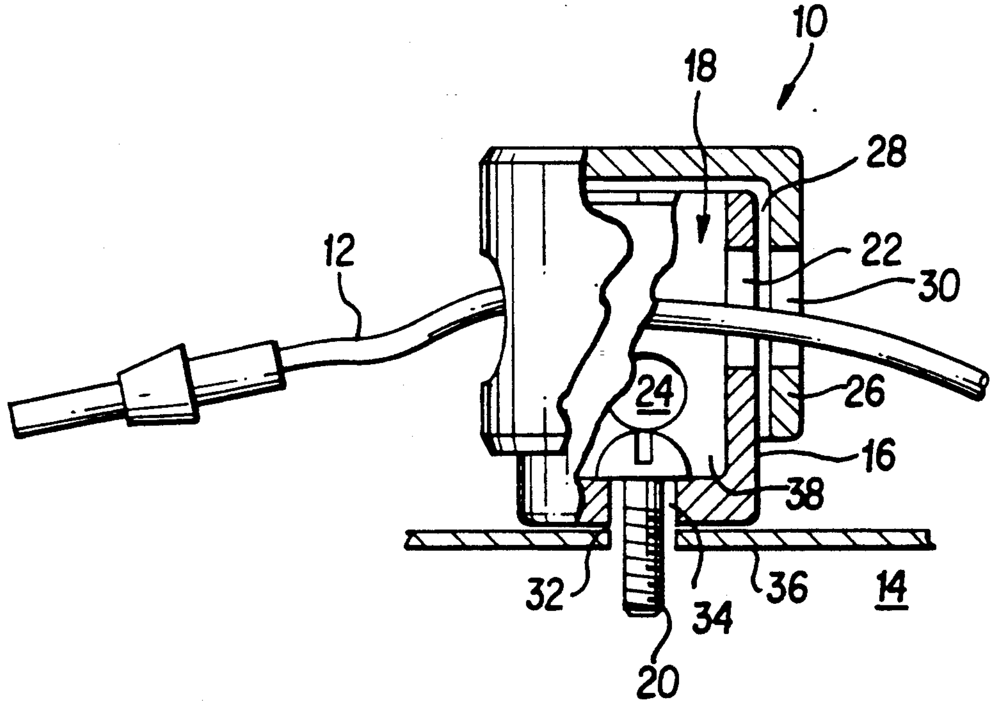
FIG. 2 is a schematic representation of a partial cross-sectional view of the apparatus.

Referring to the drawings wherein like reference numerals refer to similar or identical parts throughout the several views, and more specifically to FIG. 1 thereof, there is shown a schematic representation of an apparatus 10 for linking a cable 12 to an object 14. The apparatus 10 comprises a first element 16 having a first channel 18 passing therethrough which receives a connector 20 that fixedly links the first element 16 to the object 14. The first element 16 also has a second channel 22 passing therethrough which intersects the first channel 18 and through which the cable 12 extends. The apparatus 10 is also comprised of a blocker 24 disposed in the first channel 18 for preventing the connector 20 from being removed. In a preferred embodiment, the apparatus 10 includes a second element 26 having a chamber 28, and a third channel 30 passing therethrough and intersecting the chamber 28 such that the chamber 28 can receive the first element 16, and the second channel 22 and third channel 30 align so the cable 12 can extend through the first element 16 and second element 26 by way of the second channel 22 and third channel 30.

The first channel 18 preferably has two diameters. The smaller diameter 34 in proximity to end 32 of first channel 18 is of sufficient size to allow the narrow portion of connector 20 to pass through along its axis 40, but small enough to prevent the large end of connector 20 to pass through. The larger diameter 38 of channel 18 is large enough to receive the large end of connector 20.

The first channel 18 is preferably disposed along the axis 40 of the first element 16. Preferably, the first channel 18 is essentially perpendicular to the second channel 22. Connector 20 which passes through channel 18 along axis 40, holds and grabs object 14 and as it enters object 14 pulls element 16 to object 14 since the large end of connector 20 cannot pass through the small diameter 34 of end 32 through which channel 18 extends.

Preferably, the blocker 24 is disposed between the cable 12 and the end 32 of the first channel 18 which contacts the object 14 when in place. The blocker 24 is preferably a ball having a diameter smaller than the second diameter 38 but larger than the first diameter 34 of the first channel 18. The blocker is preferably also larger than the diameter of the second channel 22.

In the operation of the preferred embodiment, the first element 16 receives the connector 20 through the second diameter 38 and first diameter 34. The head or larger end of the connector 20 grasps the first element 16 at the start 36 of the first diameter 34 of the first channel 18. The first element 16 is then fixedly linked to the object 14, such as a computer, by the connector 20 being screwed into the object 14. At this time blocker 20 is inserted into channel 18 through large diameter 38 so as to be positioned over the large end of connector 20. The second element 26 is then positioned over the first element 16 such that the chamber 28 receives the first element 16. The second channel 22 and third channel 30 are rotated until they are aligned. A cable 12 including optical fiber is then threaded through the first element 16 and second element 26 via the second channel 22 and third channel 30 which are in alignment. The cable 12 is threaded therethrough such that the blocker 24 is positioned between the connector 20 and the cable 12. Each end of the cable 12 is then linked to, for instance, a security system which emits and then receives optical pulses. If the optical fiber of the cable 12 is ever severed, then the optical pulses cannot be received by the receive portion of the security system which causes an alarm to be triggered thus announcing that someone may be attempting to steal the object 14. When all items of apparatus 10 are in place, the only way the cable 12 can be separated from the object 14 is essentially by severing the cable 12 or disarming the security system and removing cable 12. In the preferred embodiment, the first diameter 34 is about 0.25 inches in diameter. The second diameter is about 0.437 inches in diameter. The second channel 22 and third channel 30 are about 5/16 of an inch in diameter. The chamber 28 is about 0.64 inches in diameter with the second element 26 having an outside diameter of about 0.75 inches. The outside diameter of the first element 16 is about 0.625 inches The first element 16 is about 1.125 inches long with the second diameter 38 being about 1.0 inches deep. The second element 26 is about 0.718 inches long with the chamber 28 being about 0.625 inches deep. The first element 16 and second element 26 are made out of case hardened ® steel. The blocker 24 is a stainless steel ball bearing.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for linking a cable to an object comprising:

a first element having a first channel disposed along the axis of the first element and passing therethrough which receives a connector that fixedly links the first element to the object, said first element also having a second channel passing therethrough which perpendicularly intersects the first channel and through which the cable extends;

a second element having a chamber and a third channel passing therethrough and intersecting the chamber such that the chamber can receive the first element, and with the second channel and third channel in parallel alignment so the able can extend through the first element and second element by way of the second channel and third channel;

the first channel having a first diameter in proximity to the end of the first channel which contacts the object such that the connector links the first element to the object by grasping the first element at the start of the first diameter of the first channel; and also having a second diameter which is large enough to receive the connector along the connector's axis; and a blocker disposed in the first channel for preventing the connector from being removed and preferably in the shape of a ball having a diameter smaller than the second diameter but larger than the first diameter of the first channel.

* * * * *